United States Patent
Yu

(10) Patent No.: US 9,510,162 B2
(45) Date of Patent: Nov. 29, 2016

(54) METHOD FOR ESTABLISHING GROUP BASED ON WI-FI AND WI-FI DIRECT-CONNECTION APPARATUS

(71) Applicant: ZTE CORPORATION, Shenzhen, Guangdong Province (CN)

(72) Inventor: Xin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/398,991

(22) PCT Filed: Aug. 19, 2013

(86) PCT No.: PCT/CN2013/081748
§ 371 (c)(1),
(2) Date: Nov. 5, 2014

(87) PCT Pub. No.: WO2013/189359
PCT Pub. Date: Dec. 27, 2013

(65) Prior Publication Data
US 2015/0195686 A1   Jul. 9, 2015

(30) Foreign Application Priority Data
Sep. 27, 2012   (CN) .......................... 2012 1 0374570

(51) Int. Cl.
*H04W 4/08* (2009.01)
*H04W 4/00* (2009.01)
(Continued)

(52) U.S. Cl.
CPC ............... *H04W 4/08* (2013.01); *H04W 4/008* (2013.01); *H04W 8/186* (2013.01); *H04W 76/023* (2013.01); *H04W 8/005* (2013.01); *H04W 84/12* (2013.01); *H04W 84/18* (2013.01)

(58) Field of Classification Search
CPC ... H04W 4/08; H04W 4/008; H04W 76/023; H04W 8/186; H04W 84/18; H04W 84/12; H04W 8/005

USPC .............................................. 370/338
See application file for complete search history.

(56) References Cited

U.S. PATENT DOCUMENTS

| 2011/0026504 A1 | 2/2011 | Feinberg |
| 2011/0188391 A1 | 8/2011 | Sella et al. |

(Continued)

FOREIGN PATENT DOCUMENTS

| CN | 101616399 A | 12/2009 |
| CN | 101631391 A | 1/2010 |

OTHER PUBLICATIONS

Wi-Fi Peer-to-Peer(P2P) Technical Specification; Wi-Fi Alliance Technical Committee P2P Task Group; Mar. 5, 2013; XP009163866.

(Continued)

*Primary Examiner* — Kan Yuen
*Assistant Examiner* — Richard Chang
(74) *Attorney, Agent, or Firm* — Ling Wu; Stephen Yang; Ling and Yang Intellectual Property

(57) ABSTRACT

A method for establishing a group based on Wi-Fi and a WiFi direct connection apparatus, and the method is applied in a first WiFi direct connection apparatus and comprises: the first WiFi direct connection apparatus establishing a first group, wherein the first WiFi direct connection apparatus is a group owner of the first group; acquiring apparatus information of other WiFi direct connection apparatuses requesting to join in the first group, and apparatus information of the first WiFi direct connection apparatus itself; allowing, according to the apparatus information, at least one of the other WiFi direct connection apparatuses to join in the first group; saving information of the first group and the apparatus information of all the WiFi direct connection apparatuses in the first group.

13 Claims, 4 Drawing Sheets

(51) Int. Cl.
*H04W 8/18* (2009.01)
*H04W 76/02* (2009.01)
*H04W 84/18* (2009.01)
*H04W 8/00* (2009.01)
*H04W 84/12* (2009.01)

(56) References Cited

U.S. PATENT DOCUMENTS

2012/0149309 A1  6/2012  Hubner et al.
2012/0233266 A1  9/2012  Hassan et al.
2012/0278389 A1* 11/2012 Thangadorai ......... H04W 84/20
                                                    709/204
2013/0050259 A1*  2/2013 Ahn ..................... G06F 3/1454
                                                    345/633
2013/0339504 A1* 12/2013 Montemurro ......... H04W 12/06
                                                    709/223

OTHER PUBLICATIONS

Wi-Fi Certified Wi-Fi Direct ; Personal, portable Wi-Fi technology; Wi-Fi Alliance Oct. 2010; XP55041124.

* cited by examiner

METHOD FOR ESTABLISHING GROUP BASED ON WI-FI AND WI-FI DIRECT-CONNECTION APPARATUS

TECHNICAL FIELD

The present document relates to the Wi-Fi technology, and more especially, to a method for establishing a group based on Wi-Fi and a WiFi direct connection apparatus.

BACKGROUND

Wi-Fi Direct standard allows apparatuses in the wireless network to connect with each other without a wireless router. Similar to the Bluetooth technology, this standard allows the wireless apparatuses to interconnect with each other in the form of point to point, and in terms of transmission speed and transmission distance, it has improved dramatically over Bluetooth.

Two new types of roles emerge in the new WI-FI Direct network: Group Owner (GO) and Group Client (GC), wherein, the GO can be used as a STA or AP, can also establish point-to-point secure connections with multiple GCs; while the GC is similar to STA, and can establish a P2P secure connection with the GO. By using the WIFI direct standard, an electronic device (such as a mobile terminal) can be chosen as the GO, and is simultaneously connected to the GCs such as computer, TV, digital camera and digital picture frame at home, so as to share files among the devices at any time. Similarly, a mobile terminal can be used as the GO and connected to computers, printers and other devices so as to be used in the same network. However, in an actual operation, after the user cuts the previous connection, it needs to re-select an electronic device to connect so as to re-establish a group.

The related art has the following problems: if the GO device cannot be used since it is shut down due to power failure or it leaves the current working scenario and other special reasons, the currently established group is immediately disconnected and disbanded, and the work such as file sharing or video playing being currently carried out is immediately interrupted, if it wants to continue the current network, another device needs to be selected as the GO to re-establish the network.

SUMMARY

To solve the technical problem, the embodiment of the present document provides a method for establishing a group based on Wi-Fi and a WiFi direct connection apparatus to solve, in the related art, the shortcoming that the group established between a group owner and a group client cannot be rapidly re-established a group after the disbandment.

To solve the abovementioned technical problem, the embodiment of the present document provides a method for establishing a group based on Wi-Fi, applied to a first WiFi direct connection apparatus, and said method comprising:

step one, said first WiFi direct connection apparatus establishing a first group; said first WiFi direct connection apparatus is a group owner of said first group;

step two, acquiring apparatus information of other WiFi direct connection apparatuses applying to join in said first group, as well as apparatus information of said first WiFi direct connection apparatus itself;

step three, allowing at least one of said other WiFi direct connection apparatuses to join in said first group based on said apparatus information;

step four, saving information about said first group, and apparatus information of all the WiFi direct connection apparatuses in said first group.

In said method, after said step three, it comprises: said first WiFi direct connection apparatus working as a group owner that is able to request another WiFi direct connection apparatus to upgrade to be a new group owner, or accepting an upgrade request from another WiFi direct connection apparatus, so as to make the WiFi direct connection apparatus that sends said upgrade request become the new group owner.

In said method, said first WiFi direct connection apparatus works as a group owner that is able to request another WiFi direct connection apparatus to upgrade to be a new group owner, specifically comprising: notifying the apparatus information of said first group to a designated second WiFi direct connection apparatus, meanwhile notifying the information of said second WiFi direct connection apparatus to all the other WiFi direct connection apparatuses, enabling said second WiFi direct connection apparatus and other WiFi direct connection apparatuses to recognize each other, so as to complete the group owner handover.

In said method, said step four comprises: allowing other WiFi direct connection apparatuses to store information about the first group, and apparatus information of all the WiFi direct connection apparatuses in said first group.

In said method, when said first WiFi direct connection apparatus establishes a group, popping out a group selection interface, displaying the previously saved first group on said group selection interface; said first WiFi direct connection apparatus re-establishing said first group according to the information of said first group, and the apparatus information of all the WiFi direct connection apparatuses in said first group.

In said method, re-establishing said first group specifically comprises: according to the information of said first group and said apparatus information, searching for the other WiFi direct connection apparatuses being within said first group previously, and initiating connection requests to the searched-out WiFi direct connection apparatuses in order.

In said method, when re-establishing said first group, if the apparatus information of the original third WiFi direct connection apparatus is missing, allow deleting the apparatus information of said third WiFi direct connection apparatus, or preserving an interface for re-accessing to said third WiFi direct connection apparatus.

In said method, the information of said first group comprises: connection information of the group establishment this time, stored in a temporary memory unit, a first group identification information, stored in a permanent memory unit; said apparatus information comprises: apparatus name, MAC address, IP address, security information, signal strength, channel, P2P IE and authentication information of a WiFi direct connection apparatus as a group client.

A WiFi direct connection apparatus, specifically a first WiFi direct connection apparatus, comprises:

a group establishment unit, set to establish a first group; set said first WiFi direct connection apparatus as a group owner of said first group;

an apparatus interaction unit, set to acquire apparatus information of other WiFi direct connection apparatuses applying to join in said first group, and apparatus information of said first WiFi direct connection apparatus itself;

an apparatus inter-connection unit, configured to allow at least one of said other WiFi direct connection apparatuses to join in said first group according to said apparatus information;

a memory unit, set to save information about said first group, and said apparatus information of all the WiFi direct connection apparatuses in said first group.

In said WiFi direct connection apparatus, further comprising: a role conversion unit, when working as a group owner, set to request another WiFi direct connection apparatus to upgrade as a new group owner; or accept an upgrade request from another WiFi direct connection apparatus, and make said WiFi direct connection apparatus that sends said upgrade request become the new group owner.

In said WiFi direct connection apparatus, a group reestablishment unit is further comprised and is set to, when establishing a group, pop up a group selection interface in which the previously saved first group appears; according to the information of said first group and the apparatus information of all the WiFi direct connection apparatuses in said first group, re-establish said first group.

The technical solution in the present application has the following beneficial effects:

said first WiFi direct connection apparatus acquires the apparatus information of other WiFi direct connection apparatuses applying to join in said group as well as said first WiFi direct connection apparatus itself, this apparatus information is the condition for forming said first group, after said WiFi direct connection apparatus saves the apparatus information and the group information, at the next time of reestablishing the group, it can complete the establishment based on said apparatus information as well as said group information.

PREFERRED EMBODIMENTS OF THE PRESENT

Hereinafter with reference to the accompanying drawings, the embodiment of the present document will be described in detail. It should be noted that, in the case of no conflict, the embodiments and features in the embodiments of the present application may be arbitrarily combined with each other.

Figure 1:
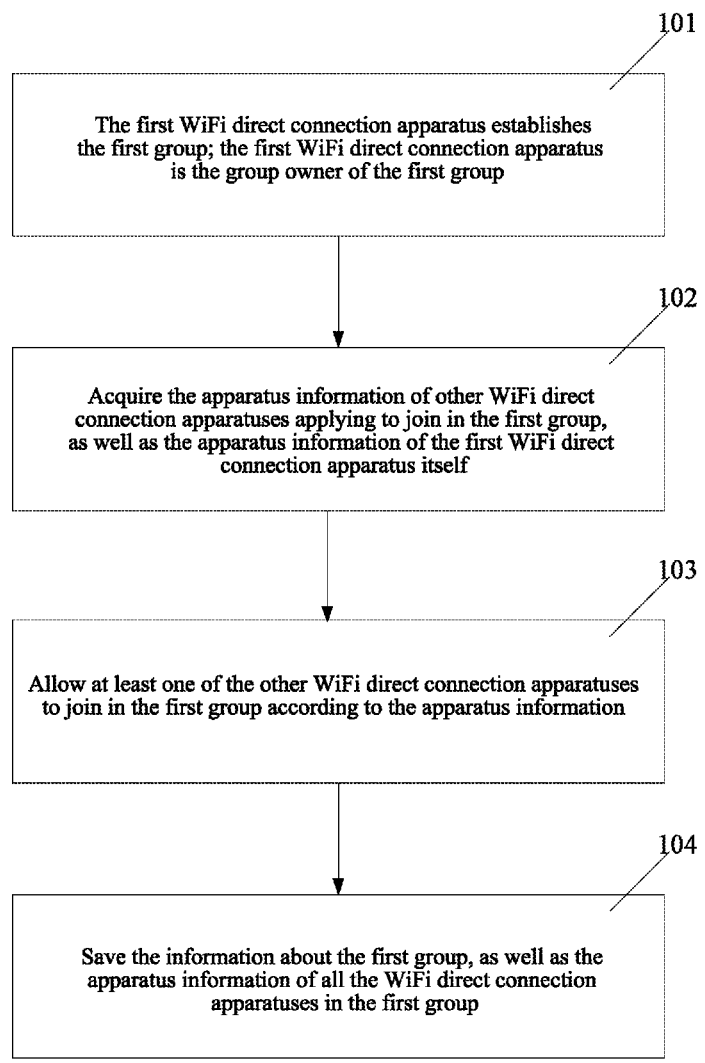
FIG. 1 is a flow chart of a method for establishing a group based on Wi-Fi.

The embodiment of the present document provides a method for establishing a group based on Wi-Fi, as shown in FIG. 1, applied to a first WiFi direct connection apparatus, and comprising:

step 101, said first WiFi direct connection apparatus establishing a first group; wherein said first WiFi direct connection apparatus is the group owner of said first group;

step 102, said first WiFi direct connection apparatus acquires the apparatus information of other WiFi direct connection apparatuses applying to join in said first group, as well as the apparatus information of said first WiFi direct connection apparatus itself;

step 103, said first WiFi direct connection apparatus allows at least one of the other WiFi direct connection apparatuses to join in said first group according to said apparatus information;

step 104, said first WiFi direct connection apparatus saves the information about said first group, as well as the apparatus information of all the WiFi direct connection apparatuses in said first group.

With the application of the provided technical solution, said first WiFi direct connection apparatus acquires the apparatus information of other WiFi direct connection apparatuses applying to join in said group as well as said first WiFi direct connection apparatus itself, the apparatus information is the condition for the formation of said first group, after said WiFi direct connection apparatus saves the apparatus information as well as the group information, the establishment can be completed based on said apparatus information and said group information in the next group reestablishment.

After said first WiFi direct connection apparatus starts up and establishes said first group, it works as the group owner (GO) and records the relevant information of every another WiFi direct connection apparatus (group client) connected with said GO, and records all the WiFi direct connection apparatuses at this time as a team as the first group, said first WiFi direct connection apparatus can save the apparatus information and the group information of several such groups in the local.

When the WiFi direct connection apparatus is turned on again and prepare to form a group network, it can choose one of the stored groups to quickly implement a connection with the stored apparatus.

The way of said WiFi direct connection apparatus being as a GO at work is not limited to initiatively establishing a group, it can also become a new group owner (GO) after negotiating with the group owner in a connection process.

In a preferred embodiment, after said step 103, comprise:

said first WiFi direct connection apparatus works as a group owner and is able to request another WiFi direct connection apparatus to upgrade to be a new group owner, or accept an upgrade request from another WiFi direct connection apparatus, and authorize the WiFi direct connection apparatus that sends said upgrade request to become the new group owner.

After said another WiFi direct connection apparatus is upgraded to be the new group owner, said first WiFi direct connection apparatus currently acting as the GO can be used as a common GC and can exit the first group or withdraw from said Wi-Fi network.

In a preferred embodiment, said first WiFi direct connection apparatus works as the group owner, it is able to request another WiFi direct connection apparatus to upgrade to be a new group owner, specifically comprising:

notifying the apparatus information of said first group to the designated second WiFi direct connection apparatus, meanwhile, notifying the information of said second WiFi direct connection apparatus to all the other WiFi direct connection apparatuses, so that said second WiFi direct connection apparatus and the other WiFi direct connection apparatuses can recognize each other, and authorizing said second WiFi direct connection apparatus to become the new group owner.

Obviously, said designated second WiFi direct connection apparatus can receive and analyze the apparatus information of the other WiFi direct connection apparatuses in the group sent by said first WiFi direct connection apparatus, all the other GC apparatuses can receive and analyze the apparatus information of said designated second WiFi direct connection apparatus sent by said first WiFi direct connection apparatus.

In the process of sending and receiving the apparatus information and the group information, the wifi communication data packets can be used to achieve. Said apparatus information and group information include but are not limited to the apparatus name, MAC address, channel, P2P IE, and authentication information.

In one application scenario, applying the provided technical solution comprises:

step 1, after said first WiFi direct connection apparatus establishes said first group, it becomes the group owner (GO) of said first group;

start up a GO handover, select a GC apparatus—said second WiFi direct connection apparatus in the first group, and request said second WiFi direct connection apparatus upgrade to be the new group owner.

Step 2, handover preparation, said first WiFi direct connection apparatus sends the apparatus information of all the GC apparatuses in the first group to said second WiFi direct connection apparatus.

Step 3, handover preparation, said first WiFi direct connection apparatus notifies the apparatus information of said second WiFi direct connection apparatus to all the other GC apparatuses in said first group.

Step 4, said first WiFi direct connection apparatus disconnects from all the other GC apparatuses.

Step 5, said second WiFi direct connection apparatus quickly establishes connections with the other GC apparatuses in said first group, comprising establishing a connection with said first WiFi direct connection apparatus (in this case, it works as a GC apparatus), and rapidly establishing a new second group, to complete the GO handover.

In a preferred embodiment, said step 104 comprises:

allowing other WiFi direct connection apparatuses to save information about said first group, and the apparatus information of all the WiFi direct connection apparatuses in said first group.

In a preferred embodiment, when said first WiFi direct connection apparatus establishes a group, pop up a group selection interface, and display the previously saved first group on said group selection interface;

said first WiFi direct connection apparatus re-establishes the first group according to the information of the first group and the apparatus information of all the WiFi direct connection apparatuses in said first group.

In a preferred embodiment, said re-establishing said first group specifically comprises:

searching for the other WiFi direct connection apparatuses located within said first group before based on the information of said first group and the apparatus information, and in turn initiating connection requests to the searched-out WiFi direct connection apparatuses.

In a preferred embodiment, after said step 104, further comprising:

When re-establishing said first group, if the apparatus information of the original third WiFi direct connection apparatus is missing, allowing deleting the apparatus information of said third WiFi direct connection apparatus, or preserving an interface to re-access said third WiFi direct connection apparatus.

Figure 2:
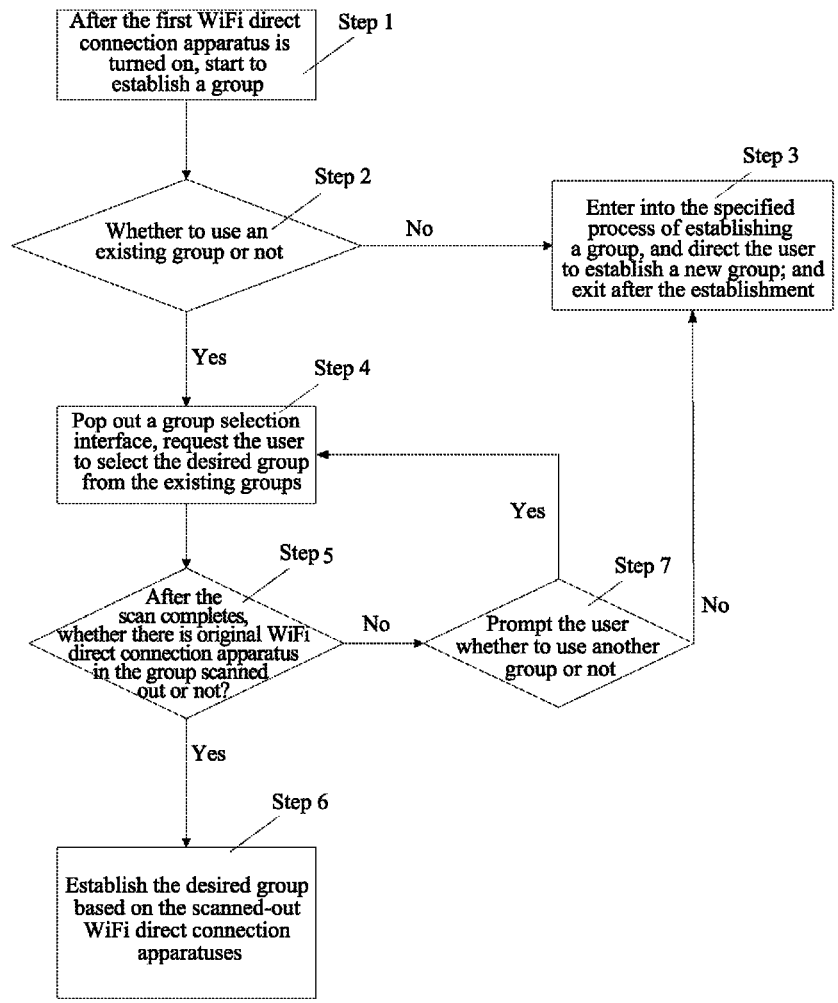
FIG. 2 is a first flow chart of a WiFi direct connection apparatus establishing a group.

In one application scenario, applying the provided technical solution, as shown in FIG. 2, comprises:

step 1, after said first WiFi direct connection apparatus is turned on, start to establish a group, and the host is defaulted as the GO of the group to be created;

step 2, prompt the user whether to use an existing group or not, if the user selects no, proceed to step 3, if the user selects yes, proceed to step 4;

step 3, said first WiFi direct connection apparatus enters into the specified process of establishing a group, and directs the user to establish a new group; and exits after the establishment.

Step 4, pop up a group selection interface, and ask the user to select the group desired to be used from the existing groups; without loss of generality, the user selects the first group.

Step 5, the first WiFi direct connection apparatus automatically scans all the WiFi direct connection apparatuses contained within said selected first group;

If, after the scan, the original WiFi direct connection apparatuses in the first group are scanned, proceed to step 6, otherwise proceed to step 7;

Step 6, initiate connections to the automatically scanned original WiFi direct connection apparatuses, so as to form the first group.

Step 7, prompt the user whether to use the currently stored other groups or not, if yes, proceed to step 4, if no, proceed to step 3.

Wherein, in said step 5, after one of the WiFi direct connection apparatuses is automatically scanned within the selected first group, skip step 5 and proceed to step 6, in said step 6, automatically initiate a connection to the scanned WiFi direct connection apparatus, then jump back to said step 5 again, and perform a next scan. Until no more other WiFi direct connection apparatuses can be scanned in step 5, jump out of the abovementioned process after step 5. If no WiFi direct connection apparatus can be scan out in the first scan in said step 5, proceed to step 7.

In a preferred embodiment, the information of said first group comprises: the link information of this group establishment, stored in a temporary memory unit, the apparatus information and the group information of said first group, stored in a permanent memory unit;

said apparatus information comprises: apparatus name, MAC address, IP address, security information, signal strength, channel, P2P IE and authentication information of the WiFi direct connection apparatuses as group members.

The memory unit comprises a temporary memory unit and a permanent memory unit, and said temporary memory unit is used to temporarily store the connection information of this group establishment, and said permanent memory unit is used to store the apparatus information and the group information of said first group, which are used for the next fast connection as well as shared with other apparatuses.

Figure 3:
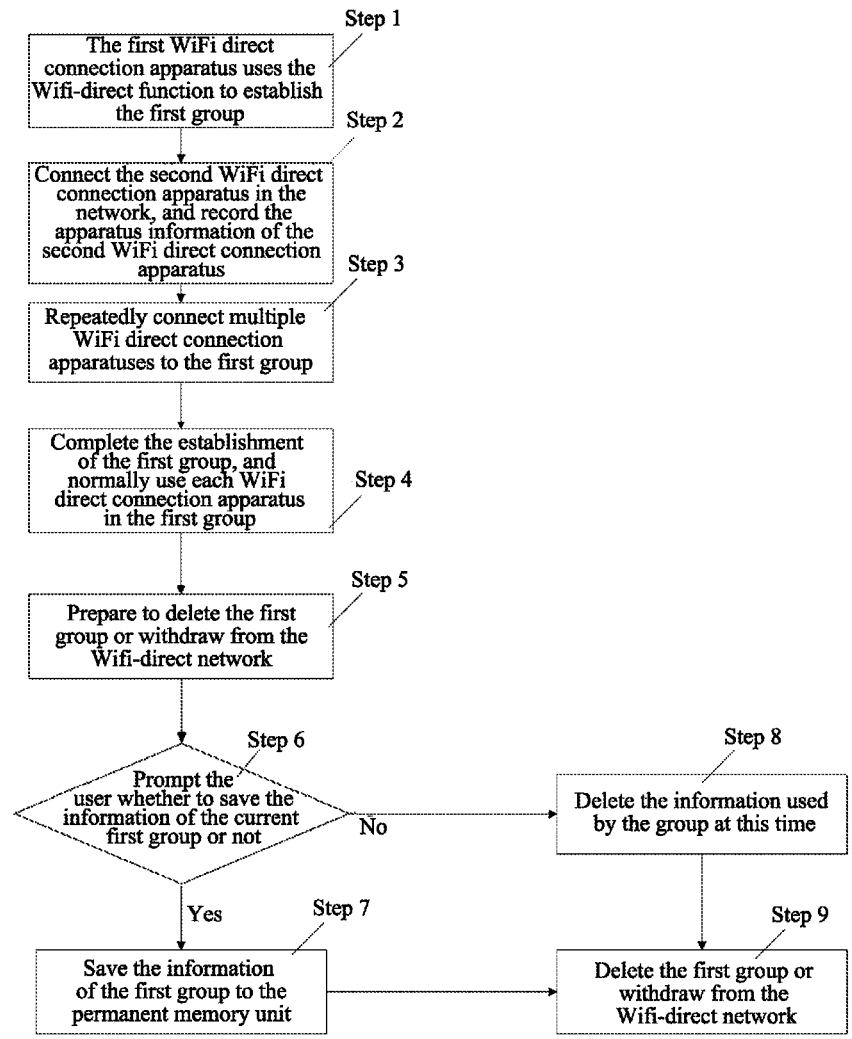
FIG. 3 is a second flow chart of a WiFi direct connection apparatus establishing a group.

In one application scenario, applying the provided technical solution, as shown in FIG. 3, in the process of establishing said first group:

step 1, said first WiFi direct connection apparatus uses the WiFi direct function to establish the first group, and said first WiFi direct connection apparatus works as the GO of said first group.

Step 2, said first WiFi direct connection apparatus connects with said second WiFi direct connection apparatus in the network; and after successfully connected with said second WiFi direct connection apparatus, records the apparatus information of said second WiFi direct connection apparatus.

Step 3, said first WiFi direct connection apparatus repeatedly connects multiple WiFi direct connection apparatuses to the current first group; records the apparatus information of said multiple WiFi direct connection apparatuses;

Step 4, complete the establishment of said first group, and normally use each WiFi direct connection apparatus in said first group.

Step 5, the use completes, ready to remove said first group or withdraw from the WiFi-direct network;

Step 6, prompt the user whether to save the information of the current first group or not, if yes, proceed to step 7, and if no, proceed to step 8;

Step 7, save the information of said first group to the permanent memory unit. Said permanent memory unit stores the apparatus information and the group information of said first group.

Step 8, remove the information record used by the group at this time.

Step 9, delete the first group or withdraw from the WiFi-direct network.

Figure 4:
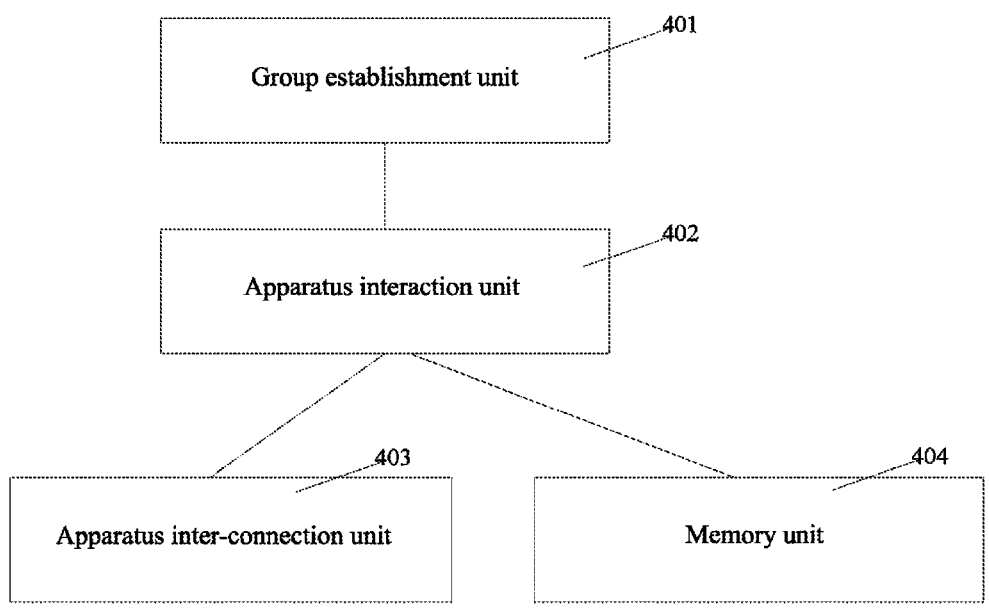
FIG. 4 is a schematic diagram of a WiFi direct connection apparatus.

The embodiment of the present document provides a WiFi direct connection apparatus, specifically a first WiFi direct connection apparatus, as shown in FIG. 4, comprising:

group establishment unit 401, set to establish a first group; set the first WiFi direct connection apparatus as the group owner of said first group;

apparatus interaction unit 402, set to acquire the apparatus information of other WiFi direct connection apparatuses applying to join in said first group, and the apparatus information of said first WiFi direct connection apparatus itself;

apparatus inter-connection unit 403, set to allow at least one of the other WiFi direct connection apparatuses to join in said first group according to said apparatus information;

memory unit 404, set to store information about said first group, and the apparatus information of all the WiFi direct connection apparatuses in said first group.

In a preferred embodiment, said first WiFi direct connection apparatus further comprises:

a role conversion unit, set to, when working as the group owner, request another WiFi direct connection apparatus to upgrade to be a new group owner;

or accept an upgrade request from another WiFi direct connection apparatus, and make the WiFi direct connection apparatus that sends said upgrade request become the new group owner.

In a preferred embodiment, said first WiFi direct connection apparatus further comprises:

a group reconstruction unit, set to, in a group establishment, pop up a group selection screen, and display the previously saved first group on said group selection interface;

re-establishing the first group according to the information of the first group, and the apparatus information of all the WiFi direct connection apparatuses in said first group.

Advantages of using this scheme are that: said first WiFi direct connection apparatus starts up and establishes a group, said first WiFi direct connection apparatus is the group owner of said group, and in the group working process, said first WiFi direct connection apparatus can specify one of the GC apparatuses in the group as the new group owner to manage the group, after which the first WiFi direct connection apparatus can be used as an ordinary GC which can exit the current WiFi direct network.

Said first WiFi direct connection apparatus can record the relevant information of each group member connected to said GO, and take all the used WiFi direct connection apparatuses at this time as a team and record them as a group, the terminal can save several such groups in the local; when turning on the WiFi direct connection apparatus again to form a group network, it can choose a certain stored group to rapidly implement a connection with the stored WiFi direct connection apparatus.

INDUSTRIAL APPLICABILITY

In the technical solution of the present application: the first WiFi direct connection apparatus accesses to the apparatus information of other WiFi direct connection apparatuses applying to join in the group as well as the first WiFi direct connection apparatus itself, this apparatus information is the condition for forming the first group, after the WiFi direct connection apparatus saves the apparatus information and the group information, at the next time of reestablishing the group, it can complete the establishment based on the apparatus information as well as the group information.

What I claimed is:

1. A method for establishing a group based on Wi-Fi, applied to a first WiFi direct connection apparatus, wherein, said method comprises:

establishing, by said first WiFi direct connection apparatus, a first group, wherein, said first WiFi direct connection apparatus is a group owner of said first group;

receiving, by said first WiFi direct connection apparatus, a joining application of at least one of other WiFi direct connection apparatuses, and acquiring apparatus information of the at least one of said other WiFi direct connection apparatuses applying to join in said first group and apparatus information of said first WiFi direct connection apparatus;

connecting the at least one of said other WiFi direct connection apparatuses-based on said apparatus information;

saving information about said first group and apparatus information of all WiFi direct connection apparatuses in said first group;

sending, by said first WiFi direct connection apparatus, an upgrade request to a second WiFi direct connection apparatus to assign said second WiFi direct connection apparatus as a new group owner of said first group;

sending, by said first WiFi direct connection apparatus, to said second WiFi direct connection apparatus the saved information about said first group and the saved apparatus information of all the WiFi direct connection apparatuses in said first group, and sending apparatus information of said second WiFi direct connection apparatus to the other WiFi direct connection apparatuses in said first group;

enabling said second WiFi direct connection apparatus and the other WiFi direct connection apparatuses in said first group to recognize each other, so as to complete a group owner handover.

2. The method of claim 1, further comprising:

storing, by the other WiFi direct connection apparatuses in said first group,-the information about said first group and the apparatus information of all the WiFi direct connection apparatuses in said first group.

3. The method of claim 1, said method further comprising:

when said first WiFi direct connection apparatus establishes a group, opening on said first WiFi direct connection apparatus a group selection interface in which the previously saved first group appears;

re-establishing, by said first WiFi direct connection apparatus, said first group according to the information about said first group and the apparatus information of all the WiFi direct connection apparatuses in said first group.

4. The method of claim 3, wherein, the re-establishing said first group comprises:
- searching for the other WiFi direct connection apparatuses included previously in said first group according to the information about said first group and the apparatus information of all the WiFi direct connection apparatuses in said first group;
- initiating connection requests to the searched-out WiFi direct connection apparatuses in order and connecting.

5. The method of claim 4, wherein,
- when re-establishing said first group, if apparatus information of an third WiFi direct connection apparatus included previously in said first group cannot be searched, deleting from the previously stored first group said third WiFi direct connection apparatus and the apparatus information of said third WiFi direct connection apparatus, or preserving an interface for re-accessing to said third WiFi direct connection apparatus.

6. The method of claim 3, wherein,
- when re-establishing said first group, if apparatus information of an third WiFi direct connection apparatus included previously in said first group cannot be searched, deleting from the previously stored first group said third WiFi direct connection apparatus and the apparatus information of said third WiFi direct connection apparatus, or preserving an interface for re-accessing to said third WiFi direct connection apparatus.

7. The method of claim 1, wherein,
- said apparatus information comprises: apparatus name, MAC address, IP address, security information, signal strength, channel, P2P IE and authentication information of a WiFi direct connection apparatus as a group member.

8. The method of claim 1, said method further comprising:
- when said first WiFi direct connection apparatus deletes said first group or exits from a WiFi-direct network, judging, by said first WiFi direct connection apparatus, whether to save the information about said first group and the apparatus information of all the WiFi direct connection apparatuses in said first group;
- if yes, saving, by said first WiFi direct connection apparatus, the information about said first group and the apparatus information of all the WiFi direct connection apparatuses in said first group to a permanent memory unit.

9. A first WiFi direct connection apparatus for establishing a group based on Wi-Fi, comprising:
- a processor and a storage device, wherein the storage device stores processor-executable programs with following units:
- a group establishment unit, to establish a first group, wherein, said first WiFi direct connection apparatus is a group owner of said first group;
- an apparatus interaction unit to receive a joining application of at least one of other WiFi direct connection apparatuses, and acquire apparatus information of the at least one of said other WiFi direct connection apparatuses applying to join in said first group and apparatus information of said first WiFi direct connection apparatus;
- an apparatus inter-connection unit to connect the at least one of said other WiFi direct connection apparatuses according to said apparatus information;
- a memory unit to save information about said first group and apparatus information of all WiFi direct connection apparatuses in said first group;
- a role conversion unit to send an upgrade request to a second WiFi direct connection apparatus to assign said second WiFi direct connection apparatus as a new group owner of said first group;
- the apparatus interaction unit, further configured to: send to said second WiFi direct connection apparatus the saved information about said first group and the saved apparatus information of all the WiFi direct connection apparatuses in said first group, and send apparatus information of said second WiFi direct connection apparatus to the other WiFi direct connection apparatuses in said first group; enable said second WiFi direct connection apparatus and the other WiFi direct connection apparatuses in said first group to recognize each other, so as to complete a group owner handover.

10. The first WiFi direct connection apparatus of claim 9, wherein, the storage device stores processor-executable programs with a further unit:
- a group reestablishment unit, configured to: when establishing a group, open on said first WiFi direct connection apparatus a group selection interface in which the previously saved first group appears; and re-establish said first group according to the information about said first group and the apparatus information of all the WiFi direct connection apparatuses in said first group.

11. The first WiFi direct connection apparatus of claim 10, wherein, the re-establishing said first group comprises:
- searching for the other WiFi direct connection apparatuses included previously in said first group according to the information about said first group and the apparatus information of all the WiFi direct connection apparatuses in said first group;
- initiating connection requests to the searched-out WiFi direct connection apparatuses in order and connecting.

12. The first WiFi direct connection apparatus of claim 11, wherein,
- when re-establishing said first group, if apparatus information of an third WiFi direct connection apparatus included previously in said first group cannot be searched, deleting from the previously stored first group said third WiFi direct connection apparatus and the apparatus information of said third WiFi direct connection apparatus, or preserving an interface for re-accessing to said third WiFi direct connection apparatus.

13. The first WiFi direct connection apparatus of claim 9, wherein,
- said apparatus information comprises: apparatus name, MAC address, IP address, security information, signal strength, channel, P2P IE and authentication information of a WiFi direct connection apparatus as a group member.

* * * * *